United States Patent [19]

McLellan

[11] Patent Number: 4,570,848

[45] Date of Patent: Feb. 18, 1986

[54] AUTOMATIC BATH WATER TEMPERATURE CONTROL

[76] Inventor: Norvel J. McLellan, 1002 N. Main St., Pleasanton, Tex. 78064

[21] Appl. No.: 575,909

[22] Filed: Feb. 1, 1984

[51] Int. Cl.⁴ .............................................. G05D 23/13
[52] U.S. Cl. .............................. 236/12.21; 137/625.4; 236/99 J
[58] Field of Search ............... 236/12.19, 12.21, 12.22, 236/99 J, 12.2, 12.23; 137/625.4

[56] References Cited

U.S. PATENT DOCUMENTS 2,584,417 2/1952 Branson ............................ 236/12.22
3,844,476 10/1974 Bales, Sr. ......................... 236/12.22

Primary Examiner—William E. Wayner

[57] ABSTRACT

The device is a water temperature controller that has hot and cold water input and an output water temperature that is automatically kept at the temperature at which its hand settable control is set.

It has a temperature sensitive element that drives a bellows and the bellows drive hot and cold water valves. The temperature sensitive element is a long, small diameter tube, filled with liquid, to have good coupling between the liquid in the sensing tube and output water to have good response time. The inside volume of the sensing tube is many times the inside volume of the bellows to have good temperature control.

1 Claim, 4 Drawing Figures

AUTOMATIC BATH WATER TEMPERATURE CONTROL

BACKGROUND

This device allows automatic control of the temperature of bath and/or shower water.

SUMMARY

The device is turned on by opening a hand valve that allows water to flow through a two port valve. One port passes cold water and one passes hot water. The amount of water that flows through each port is determined by the setting of temperature control knob and by the temperature of each of the input waters.

DESCRIPTION OF DRAWINGS

The drawings are not to scale.
FIG. one is a cross section of the device.
FIG. two is end of valve plug part 2 that has threads inside.
FIG. three is end of valve plug part 2 that has a square hole in it.
FIG. four is end view of center section of valve plug part 2.

DESCRIPTION OF INVENTION

Figure 1:
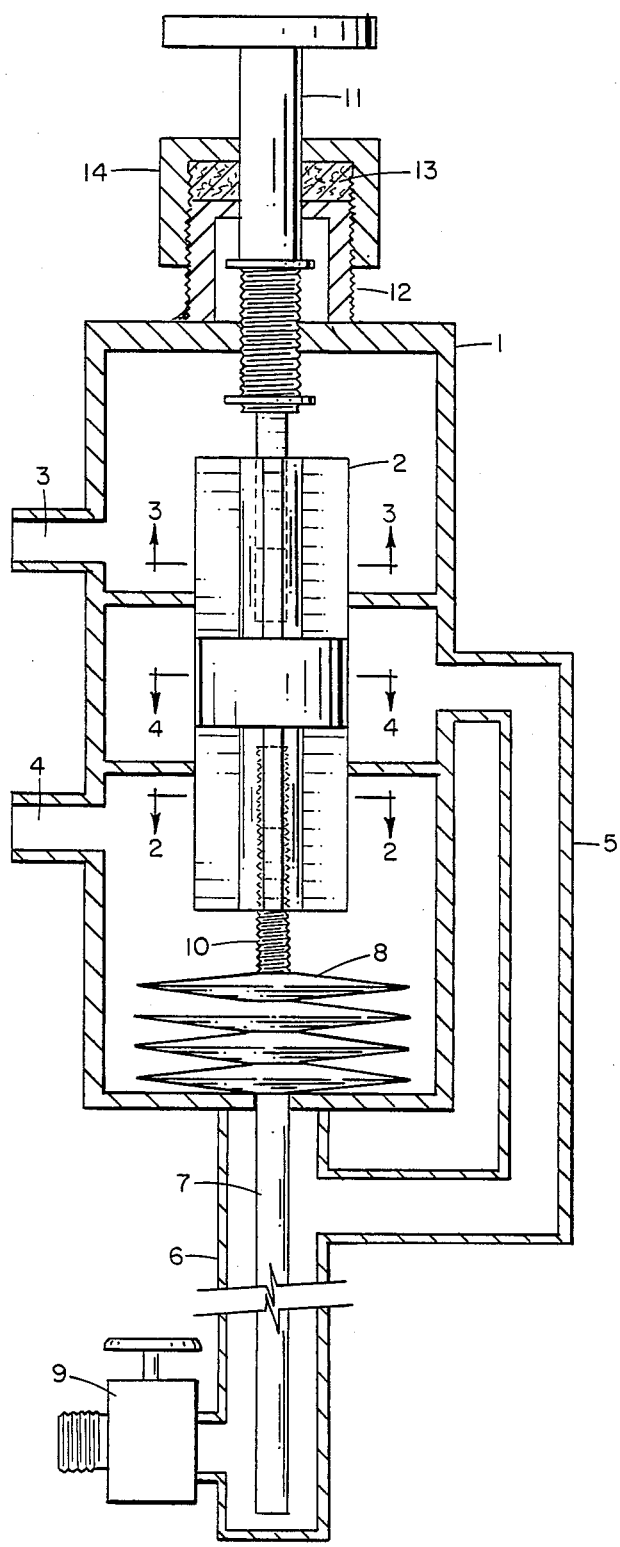
Figure 2:
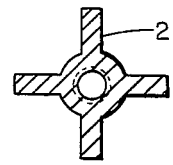
Figure 3:
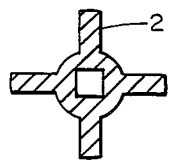
Figure 4:
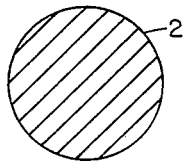

The invention is a combination two port valve and thermostat. In FIG. 1 part 1 is housing, part 2 is valve plug, part 3 is hot water inlet, part 4 is cold water inlet, part 5 is connecting tube, part 6 is sensing pipe, part 7 is sensing tube, part 8 is metal bellows. Part 7 and 8 are filled with liquid. alcohol was used in test model. Part 9 is water oulet valve, part 10 is a screw. Part 10 is attached to part 8. Part 11 is temperature adusting shaft. Part 11 has a knob on one end, is partly threaded, has two washers to limit the movement of itself and a square part on end opposite knob. The said square part is a slip fit in the square hole in valve plug part 2. Part 12 is packing bolt, part 13 is packing and part 14 is nut. FIG. 2 is end of valve plug that has threads inside. FIG. 3 is end of valve plug that has a square hole in it. FIG. 4 is end view of center section of valve plug. A gas or a mixture of a gas and liquid could be used in tube 7.

Operation: For explanation assume ambient temperature is 70° F. and water in water heater is 130° F. and temperature control is set at 100° F. If threads on part 10 and 11 are right hand, turning control knob to the right will raise temperature of output water. When valve 9 is opened water from water heater will flush 70° water out of system and hot water flowing through sensing pipe 6 will cause liquid in sensing tube 7 to expand causeing metal bellows to lengthening and start opening cold water port and start closing hot water port. Cold and hot water will mix in sensing pipe 6 causing metal bellows to stop lengthening when cold and hot water ports are open enough that water through sensing pipe 6 is near 100° F. A gas or mixture of gas and liquid could be used in sensing tube 7. "cold water" is ambient temperature water. "hot water" is above ambient temperature water.

FIG. one is shown with valve 9 open and water flowing. The two partitions in housing 1 have holes through them that act as valve seats. The center part of valve plug is a solid round bar, see FIG. 4. The two end pieces of valve plug 2 are cross shaped bars, see FIGS. 2 and 3.

In FIG. 1 the position valve plug 2 is shown water can flow through both ports through the four openings in each of the end pieces of valve plug 2, see FIGS. 2 and 3.

If shaft 11 is screwed in the center part of valve plug 2 will move toward the cold water valve seat and away from the hot water valve seat the temperature of the out put water will be raised.

The inside volume of sensing tube 7 is many times the inside volume of bellows 8. This ratio, plus the good thermal coupling between the output water and the liquid in sensing tube 7 give good response time FIG. one shows that valve plug 2 can pass through the valve seats to prevent strain on the partitions of housing one when the device is set for a lower temperature than ambient.

I claim:

1. A water temperature controller that has a two port valve with an inlet for cold water and an inlet for hot water and a pipe that carries the output water and a port to pass hot water and a port to pass cold water and the two ports have a common valve plug has a center section that is a solid bar and two end sections that are cross shaped bars that can pass water through the valve seats and the valve plug is connected to a bellows by a bolt on one end of the bellows and threads in a hole in one end of the valve plug and the bellows is connected to a sensor tube with the inside of the sensor tube and the inside of the bellows common and both are filled with liquid and the sensor tube is inside the pipe that carries the output water of the two port valve and the end of said pipe that is not connected to the two port valve has a hand operated valve connected to it and the end of the valve plug that is not connected to the bellows has a square hole in it into which a square rod is inserted and the square rod is attached to a handle that can be turned to adjust the temperature of the output water.

* * * * *